Figure 1:
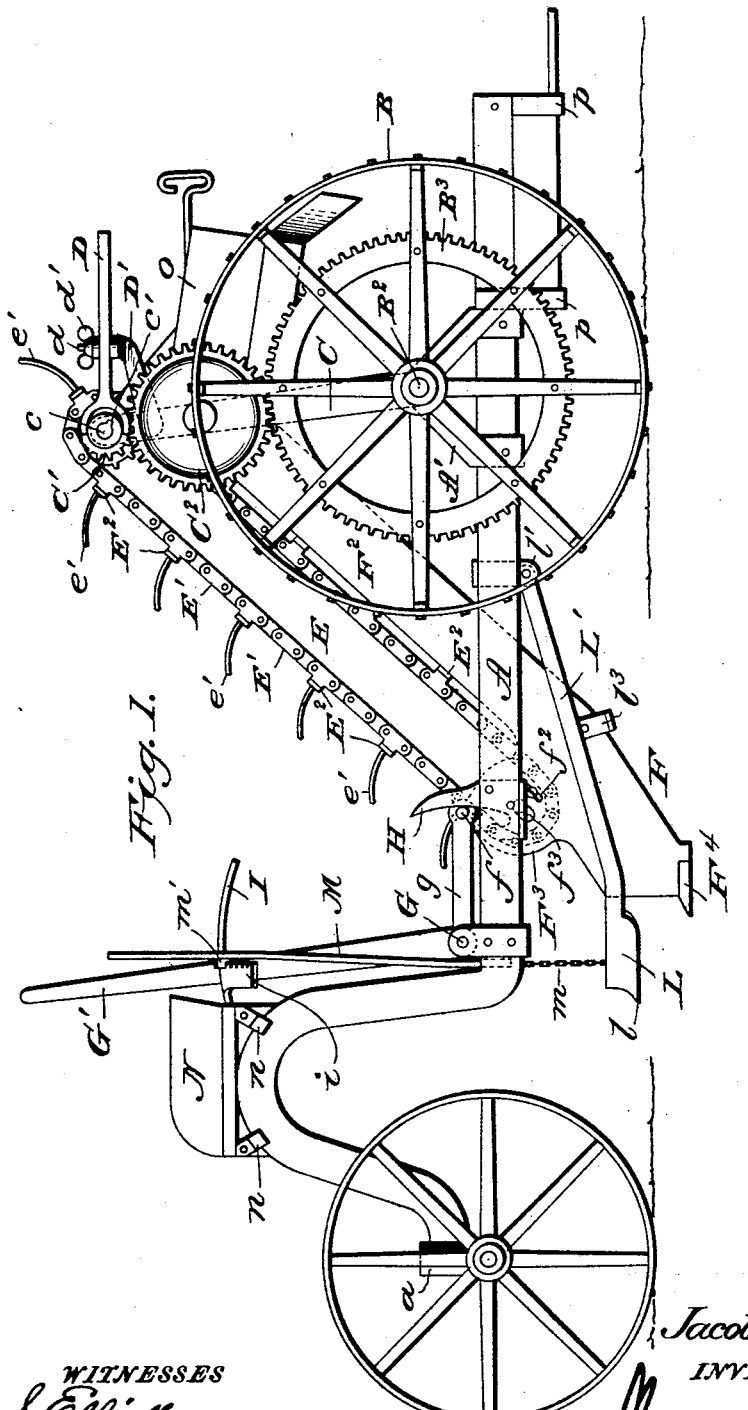

(No Model.) 3 Sheets—Sheet 1.

J. SCHWARTZ.
POTATO DIGGER.

No. 591,642. Patented Oct. 12, 1897.

WITNESSES

Jacob Schwartz
INVENTOR by
Attorney

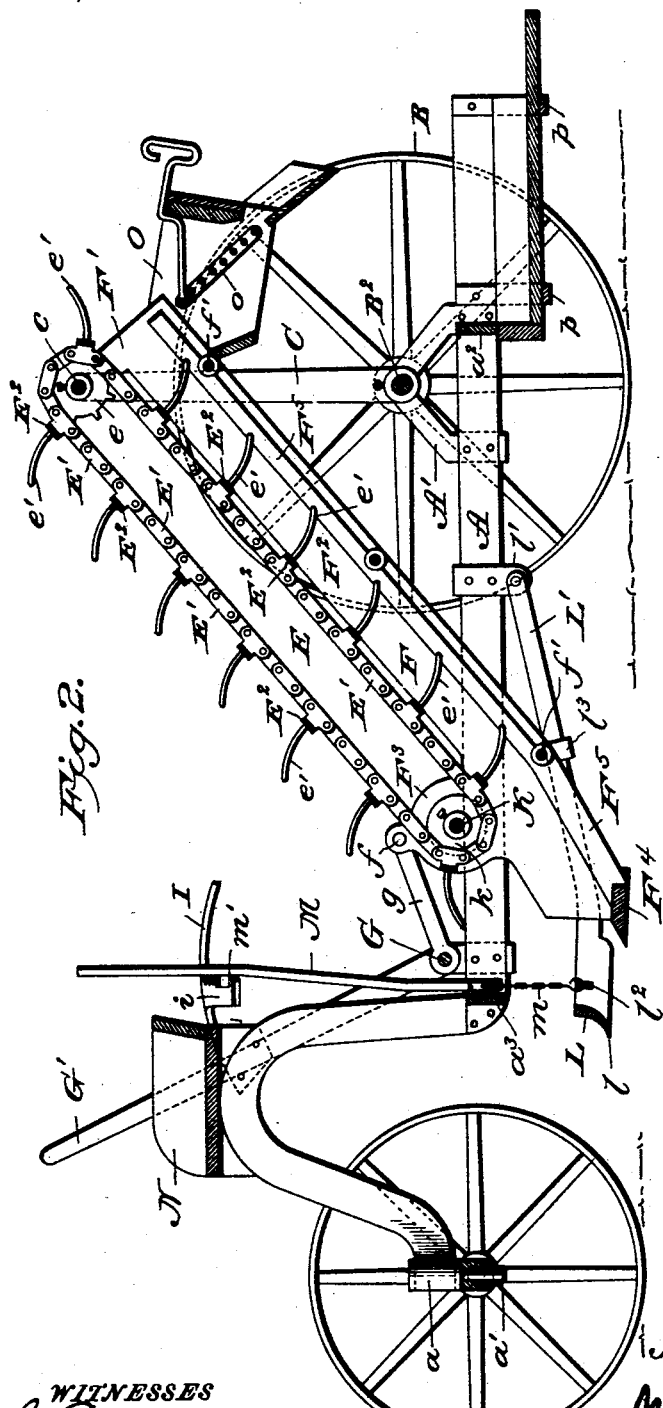

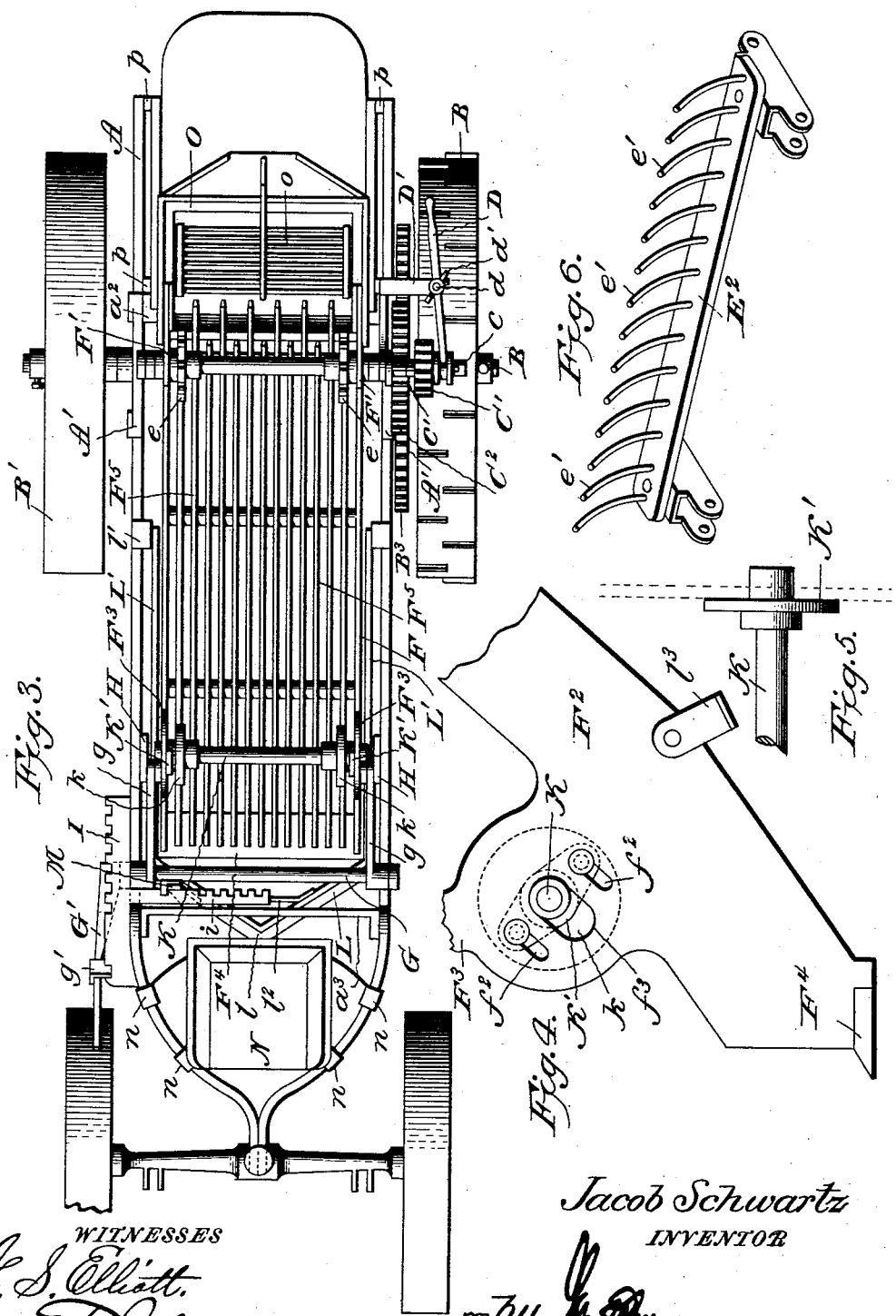

UNITED STATES PATENT OFFICE.

JACOB SCHWARTZ, OF PORTLAND, OREGON.

POTATO-DIGGER.

SPECIFICATION forming part of Letters Patent No. 591,642, dated October 12, 1897.

Application filed January 16, 1896. Serial No. 575,762. (No model.)

*To all whom it may concern:*

Be it known that I, JACOB SCHWARTZ, a citizen of the United States of America, residing at Portland, in the county of Multnomah and State of Oregon, have invented certain new and useful Improvements in Potato-Diggers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a machine of improved construction for digging potatoes, separating them from the soil, and assorting them prior to depositing them into bags or other suitable receptacles, all of which is done as the machine is drawn across the garden.

The invention consists in the novel construction and arrangement of the parts, as will be hereinafter fully set forth, and includes an improved construction of frame which carries a digger and a plow or scraper for removing the top soil and vines in advance of the digger, said digger and scraper being both vertically adjustable, the digger having a slatted inclined frame in the rear of the same, over which passes an endless toothed carrier, the upper ends of the slats being so organized that each alternate slat is longer than the adjoining one, so that the potatoes may be separated before being deposited into the hopper to which the bags or receptacles are attached, a platform being positioned below the hopper upon which an attendant stands.

In the accompanying drawings, forming part of this specification, Figure 1 is a side elevation of a potato-digger constructed in accordance with my invention. Fig. 2 is a longitudinal sectional view. Fig. 3 is a plan view with the endless carrier removed. Fig. 4 is a detail view of the mechanism for adjusting or tightening the endless carrier. Fig. 5 is a detail view of one of the wheels over which the sprocket-chains of the endless carrier pass, and Fig. 6 is a detail perspective view of one of the toothed cross-bars of the endless carrier.

A designates the longitudinal side pieces of the main frame of the machine, which are preferably made up of two continuous bars, similarly shaped and connected to each other at their forward ends by a block $a$, through which passes a king-bolt $a'$, which connects the forward end of the main frame to the axle of the front wheels. It will be noted that the side pieces or bars A A are arched at their forward ends and converge so as to not only provide a frame in which the wheels can turn under the forward part of said frame, but also provide an elevated support for the driver's seat. The side pieces A A are connected to each other near their rear ends by a transverse bar $a^2$ and in the rear of their arched portions by a transverse bar $a^3$, the rear end of the frame being further braced by the platform hereinafter referred to.

B and B' designate the rear supporting-wheels of the machine, the wheel B being a traction-wheel, from which the endless carrier is driven, as hereinafter described. The wheels B and B' are journaled upon an axle $B^2$, which is supported in brackets A', rigidly secured to the longitudinal side pieces of the main frame. Upon the axle $B^2$ are rigidly secured two uprights C C, in the upper ends of which is journaled a transverse shaft $c$, and this shaft projects beyond one of the uprights, so as to lie over the traction-wheel B, from which it is driven by means of a toothed rim $B^3$, attached to the spokes of the traction-wheel and geared to a pinion C' on the shaft through the interposition of a gear-wheel $C^2$, journaled upon a stub-shaft secured in the adjoining upright. The pinion C' is keyed to the shaft $c$ by means of a spline or feather $c'$, which permits the pinion to slide thereon, said pinion being provided with a peripherally-grooved hub, with which the bifurcated end of a lever D engages for throwing the pinion in and out of mesh with the gear-wheel $C^2$. The lever D is pivoted upon a bracket arm D', extending from the adjoining upright C, and the pivot-pin $d$ of the lever is threaded to receive a thumb-nut $d'$, which is adapted to clamp the lever in an adjusted position. The shaft $c$ has rigidly attached thereto sprocket-wheels $e\ e$, over which pass the side chains of the endless carrier E, said endless carrier moving over a frame F, which is suspended at its upper end from the shaft C by means of arms F', projecting from the side pieces F² thereof, the lower end of the frame being supported by arms g g, which project rearwardly from a transverse rock-shaft G, mounted in bearings rigidly secured to the longitudinal side pieces of the main frame, the arms g being connected at their outer ends to upwardly-projecting members F³ of the side pieces of the frame F by means of studs f, said studs projecting beyond the arms to engage curved guide-bars H H, which extend upwardly from the side pieces of the main frame. By this arrangement the lower end of the frame F may be raised and lowered by rocking the shaft G, said shaft being rocked by means of a lever G', secured to the outer end thereof and projecting upwardly, a lug g', carried by the lever, engaging the teeth of a rack-plate I, extending rearwardly from the arched portion of one of the longitudinal side pieces of the main frame.

The frame F is provided at its lower end with a transverse plate F⁴, rigidly secured at its ends to the side pieces of said frame, and the forward edge of this plate is beveled or sharpened to form the digger. The side pieces of the frame F are also connected to each other at suitable intervals by transverse bars f', which support a series of longitudinal slats F⁵, extending from the transverse plate F⁴ to the upper end of the frame, each alternate slat projecting beyond the upper cross-bar, as shown in Fig. 3.

As hereinbefore stated, the upper end of the endless carrier E moves over the sprocket-wheels e upon the shaft c. The lower end of the endless carrier, or rather the side chains thereof, move over disks k, attached to a transverse shaft K, journaled at its ends in disks or plates K', which are adjustably secured to the upwardly-projecting members F³ of the side pieces of the frame F, the disks or plates being secured to said members by means of screws which pass through slots f² therein, a slot f³ being provided to receive the extended portions of the disks K'. By supporting the shaft K so that it can be moved backward and forward with respect to the frame F the endless carrier can be tightened or loosened when desired. The endless carrier is made up of sprocket-chains E' E', connected to each other by transverse bars E², from which project teeth e', and these teeth are so spaced that in moving over the frame F they will travel in the spaces between the slats F⁵.

L designates the cutter or scraper, which consists of a blade which comes to a point l at its center and is rigidly secured at its ends to rearwardly-projecting arms L' L', which are pivoted to brackets l', depending from the side pieces of the main frame of the machine. The blade is provided with a forwardly-projecting cutting edge, and in the rear of the point l is secured a strap l², to which a chain m is connected, said chain extending to a lever M, which is pivoted to the cross-bar a' of the main frame of the machine, and by operating this lever the cutter or scraper can be adjusted vertically with respect to the digger. The lever M is held in an adjusted position by means of a lug m', carried thereby, engaging the teeth of the member i of the rack-plate I. The downward movement of the cutter or scraper is limited by the arms thereof engaging stops l³, which depend from the side pieces of the frame F. It will be noted that the levers G' and M are located within easy reach of the driver's seat N, which is supported between the arched portions of the side pieces A A, being held in engagement therewith by metal loops n n, secured to the seat and overlying the upper edges of said side pieces.

To the upper end of the frame F is pivotally attached a hopper O, and within this hopper is pivoted a grate or bottom o, and by tilting this grate or bottom it can be positioned on a line with the lower part of the discharge-opening of the hopper or tilted to collect the potatoes while a new bag is being placed in position. It will be noted that the larger potatoes, which pass over the ends of the longer longitudinal slats F⁵, fall upon the grate o, while the smaller potatoes pass between said slats and are discharged through the other part of the hopper. To the lower end of the hopper suitable means may be attached for holding the bags in position, and, below the hopper is positioned a platform upon which stands the attendant who changes the bags or receptacles, said platform being secured to the longitudinal side pieces of the main frame by means of bars p p.

From the foregoing description the operation of the device or machine will be readily understood. The digger being adjusted to enter the ground to the proper depth and the cutter or scraper adjusted to move over the surface of the ground, the machine is drawn across the garden, the scraper cutting the plants and throwing them to one side, while the digger loosens up the potatoes and forces them back, so that they will be caught by the teeth of the endless carrier and moved up the slats and deposited over the upper ends of the same into the hopper, the soil scooped up with the potatoes being sifted through the spaces between the inclined slats.

Having thus described my invention, what I claim as new, and desire to secure by Letters Patent, is—

1. In a potato digger and harvester, the combination with a wheeled frame having uprights in the upper end of which is journaled a shaft c driven from one of the supporting-wheels substantially as shown, of a frame F suspended at its upper end from the shaft c and connected at its lower ends to arms projecting from a rock-shaft journaled in the main frame, the frame F² having projecting portions F³ with slots f² and f³, plates K' supporting a transverse shaft K, said plates being secured to the lower end of the frame F by screws which pass through slots in the side pieces of said frame; together with an endless carrier passing over sprocket-wheels on the shaft $c$ and over disks on the shaft K, substantially as shown and for the purpose set forth.

2. The combination with a potato-digger having a movable frame F with a slatted bottom over which passes an endless carrier, said frame having upwardly-projecting portions with slots $f^2 f^2$ and $f^3$, of bearing-plates K' in which is mounted a transverse shaft having disks over which the endless carrier passes, and adjusting screws or bolts which pass through the slots $f^2$ in the side pieces of the frame F and engage the plates K' to adjustably connect the same thereto, substantially as shown and for the purpose set forth.

3. The combination with the frame A carrying a rock-shaft G having rearwardly-projecting arms $g$, of a slatted frame F supporting an endless carrier-belt, the arms $g$ being connected to the lower forward end of the frame F by studs $f$ which project beyond the arms, and plates H rigidly secured to the side pieces of the main frame and having a curved surface and socket with which the studs $f$ engage, substantially as shown and for the purpose set forth.

4. The combination with a potato-digger constructed substantially as shown to present a wheel-frame carrying an adjustable frame F provided with longitudinal bars and means for supporting above the same an endless carrier-belt which is driven from one of the supporting-wheels, of adjustable bearings carried by the frame F and having one of the shafts over which the endless belt passes mounted therein, a rock-shaft supported on the main frame and provided with an operating-lever and rearwardly-projecting arms which are connected to the frame F, and plates H secured to the side pieces of the main frame and having a curved surface and socket with which the connecting portion of the arms engage; together with a rack-plate with which the operating-lever engages, the parts being organized substantially as shown and for the purpose set forth.

In testimony whereof I affix my signature in presence of two witnesses.

JACOB SCHWARTZ.

Witnesses:
   D. A. EPSTEYN,
   CHRIS. TOCHLE.